US005749631A

United States Patent [19]

Williams

[11] Patent Number: 5,749,631

[45] Date of Patent: May 12, 1998

[54] DUAL CAN ROTATING TRANSFER PLATE TO CONVEYOR BELT

[75] Inventor: Robert Williams, Randolph, N.J.

[73] Assignee: Sequa Corporation, Hackensack, N.J.

[21] Appl. No.: 640,012

[22] Filed: Apr. 30, 1996

[51] Int. Cl.[6] .......... B65G 47/84

[52] U.S. Cl. .......... 198/441; 198/471.1; 198/689.1; 101/37; 101/40

[58] Field of Search .......... 198/370.03, 441, 198/471.1, 487.1, 689.1, 803.12, 803.16, 608; 101/36, 37, 39, 40, 40.1

[56] References Cited

U.S. PATENT DOCUMENTS

| | | | |
|---|---|---|---|
| 2,878,620 | 3/1959 | Calehuff et al. | 198/608 |
| 3,760,453 | 9/1973 | Neumann | 198/689.1 |
| 3,775,862 | 12/1973 | Emge | 198/471.1 |
| 3,907,095 | 9/1975 | Russell et al. | 101/40 |
| 3,915,085 | 10/1975 | Lehmann | 198/689.1 |
| 4,445,431 | 5/1984 | Stirbis | 101/40 |
| 4,736,831 | 4/1988 | Fields | 198/395 |
| 4,771,879 | 9/1988 | Shriver | 198/471.1 |
| 4,773,522 | 9/1988 | Lenhart | 198/425 |
| 4,830,169 | 5/1989 | Nariki et al. | 198/345 |
| 4,942,955 | 7/1990 | Shriver et al. | 198/471.1 |
| 4,974,716 | 12/1990 | Yuri et al. | 198/345 |
| 4,984,960 | 1/1991 | Szarka | 414/752 |
| 5,183,145 | 2/1993 | Williams et al. | 198/441 |
| 5,231,926 | 8/1993 | Williams et al. | 101/40 |
| 5,253,580 | 10/1993 | Dee et al. | 198/441 |

*Primary Examiner*—Joseph E. Valenza

*Attorney, Agent, or Firm*—Mitchell D. Bittman; Jerome M. Berliner

[57] ABSTRACT

The output end of a very high speed continuous motion cylindrical can decorator is provided with unloading apparatus in the form of a continuously moving closed loop belt and a continuously rotating disk. Decorated cans are delivered to the disk, with rearward facing open ends of the cans engaging the front face of the rotating disk and being held against the front face, preferably by rearward directed suction forces. Cans are moved by the disk into close proximity with an upward moving flight of the belt, and are transferred to the latter by forward directed suction forces which act through the upward moving flight to draw the closed ends of the cans against the upward moving flight. The rearward acting suction forces act through the disk and are applied at those portions of the disk that are at angular positions which are selected to assist transfer of cans to the disk. Application of the rearward acting suction forces are discontinued at those portions of the disk that are at angular positions where cans are transferred from disk to the belt. When the decorated cans are constructed of ferrous materials, suction transfer and holding forces which act on the cans may be replaced by magnetic forces.

20 Claims, 6 Drawing Sheets

DUAL CAN ROTATING TRANSFER PLATE TO CONVEYOR BELT

BACKGROUND OF THE INVENTION

The present invention relates generally to continuous motion apparatus for decorating cylindrical containers, and relates more particularly to apparatus of this type that does not require a deco chain for conveying decorated containers to a curing oven.

In high speed continuous motion equipment that decorates cylindrical containers (cans) for beverages and the like, decorated containers having wet decorations thereon are off-loaded onto pins of a so-called deco chain that carries the containers through an ink curing and drying oven. Examples of this type of decorating equipment are disclosed in U.S. Pat. No. 5,183,145 which issued Feb. 2, 1993 to R. Williams et al., entitled Apparatus And Method For Automatically Positioning Valve Means Controlling The Application of Pressurized Air To Mandrels On a Rotating Carrier, and in U.S. Pat. No. 4,445,431 which issued May 1, 1984 to J. Stirbis entitled Disk Transfer System. Incorporated herein by reference are teachings of U.S. Pat. Nos. 5,183,145 and 4,445,431, as well as teachings of prior art patents referred to therein.

Over the years, production speeds of continuous motion can decorators have increased, now surpassing 1,800 cans/min., and problems of unloading cans with wet decorations onto deco chain pins as well as problems with deco chains per se, have become more apparent and bothersome. These problems include excess noise and can damage because of engagement between metal cans and metal pins. Not only are long deco chains expensive, but because they are constructed of so many parts there is a tendency for the chains to wear out and break down when operated at very high speeds.

Because of the foregoing problems, where feasible, decorated containers, especially those constructed of iron are carried through curing ovens on belts rather than on the pins of a deco chain. An example of this type of equipment using belts is found in U.S. Pat. No. 4,771,879 which issued Sep. 20, 1988 to F. L. Shriver for a Container Transfer System. The teachings of U.S. Pat. No. 4,771,879 as well as teachings of prior art patents referred to therein are also incorporated herein by reference.

In U.S. Pat. No. 4,771,879 cans are decorated while they are on mandrels that are mounted along the periphery of a mandrel wheel and extend axially forward therefrom. The decorated cans are transferred from the mandrels to a wheel-like first transfer conveyor, then to an edge of a wheel-like second transfer conveyor and then to a belt conveyor which carries the containers with wet decorations thereon to and through a curing oven. Cans conveyed by the second transfer conveyor project radially with respect to the rotational axis of the second transfer conveyor. While there is no deco chain, the second transfer conveyor of U.S. Pat. No. 4,771,879 is an expensive structure that is constructed of many parts and there must be very close coordination between operation of the first and second transfer conveyors. Further, rotational axes for the transfer conveyors are transverse to one another resulting in inefficient utilization of space.

SUMMARY OF THE INVENTION

According to the instant invention, just as in U.S. Pat. No. 4,771,879, cans with wet decorations thereon are transferred from the mandrel wheel to a first transfer conveyor wheel, then to a second transfer conveyor wheel, and thereafter to a conveyor belt. The most obvious differences between U.S. Pat. No. 4,771,879 and the instant invention is that in the latter the rotational axes of the transfer conveyors are parallel to each other and the second transfer conveyor in the instant invention has a simplified construction because cans conveyed thereby project axially with respect to the rotational axis of the second transfer conveyor. More particularly, the second transfer conveyor includes a rotating plate and a stationary suction manifold having an open side that is covered by a perforated portion of the plate as it rotates.

As cans are received by the first transfer conveyor, they are traveling in a single row, and as the first transfer conveyor rotates, the cans are rearranged into two rows from which they are transferred to the rotating plate. Open ends of the cans engage a main planar surface of the plate at areas thereof where perforations through the plate are arranged in two circular rows formed about the rotational axis of the plate as a center. Suction forces within the manifold extend through the plate perforations to draw the cans rearward toward the rotating plate while the cans pass over the manifold. As the influence of manifold suction on the cans is reduced, the closed ends of the cans engage a vertical flight of a moving perforated belt conveyor and are held thereon by suction forces that extend through the belt conveyor. The latter may carry the cans through a curing oven or transfer them to another conveyor that extends through the curing oven.

Accordingly, the primary object of this invention is to provide apparatus that conveys cans from a continuous motion high speed decorator through a curing oven without placing the cans on pins of a deco chain.

Another object is to provide apparatus of this type in which there are partially overlapping first and second transfer conveyors that rotate on laterally offset parallel horizontal axes, with the second transfer conveyor including a rotating plate having a planar surface that receives cans from the first transfer conveyor with the open ends of the cans directly engaging a planar surface which is perpendicular to the rotational axis of the second transfer conveyor.

Still another object is to provide apparatus of this type in which the cans are transferred directly from the planar surface to a moving vertical flight of a belt conveyor.

A further object is to provide apparatus of this type having operating principles that enable suction as well as magnetic forces to be utilized for holding ferrous containers.

A still further object is to provide apparatus of this type in which linear speed for containers on the second transfer conveyor may be less than the linear speed for the containers on the first transfer conveyor.

These objects as well as other objects of this invention will become apparent to those skilled in the art after reading the following description of the accompanying drawings in which:

DETAILED DESCRIPTION OF THE DRAWINGS

As may be desired to amplify the following description, reference should be made to the aforesaid U.S. Pat. No. 5,183,145 as well as other prior art previously referred to.

Figure 1:
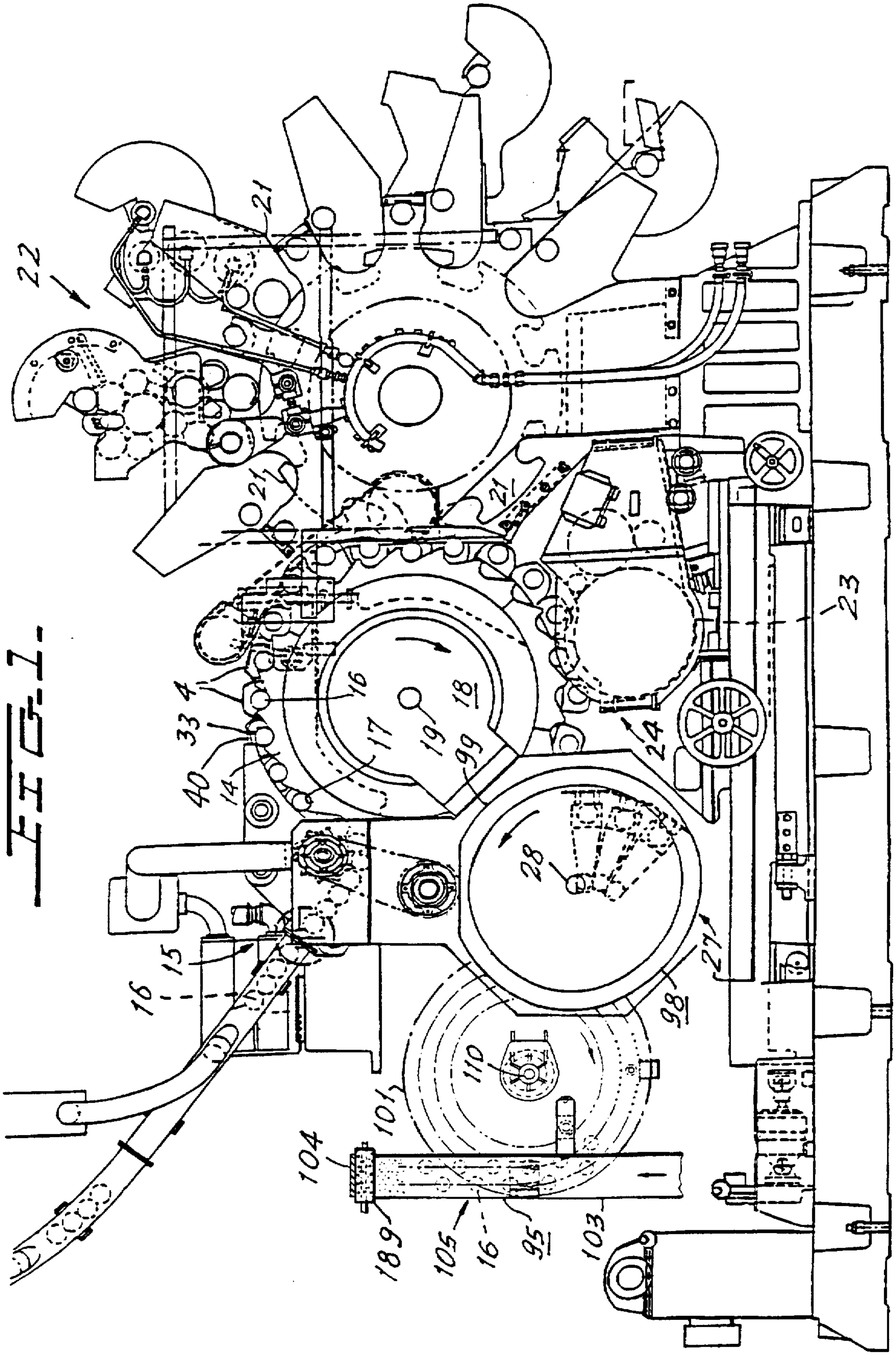
FIG. 1 is a side elevation of continuous motion can decorating apparatus constructed in accordance with teachings of the instant invention.

Now referring to the drawings and more particularly to FIG. 1 that illustrates continuous motion cylindrical can decorating apparatus which includes the instant invention. The input end at the right side of the apparatus illustrated in FIG. 1 herein is the same as the input end of the apparatus illustrated in FIG. 1 of U.S. Pat. No. 5,183,145. However, in the instant invention the output end of the apparatus includes a suction transfer conveyor plate 102 and a belt conveyor 105 in place of the pin carrying deco chain at the output end of the apparatus illustrated in FIG. 1 of U.S. Pat. No. 5,183,145.

Figure 2:
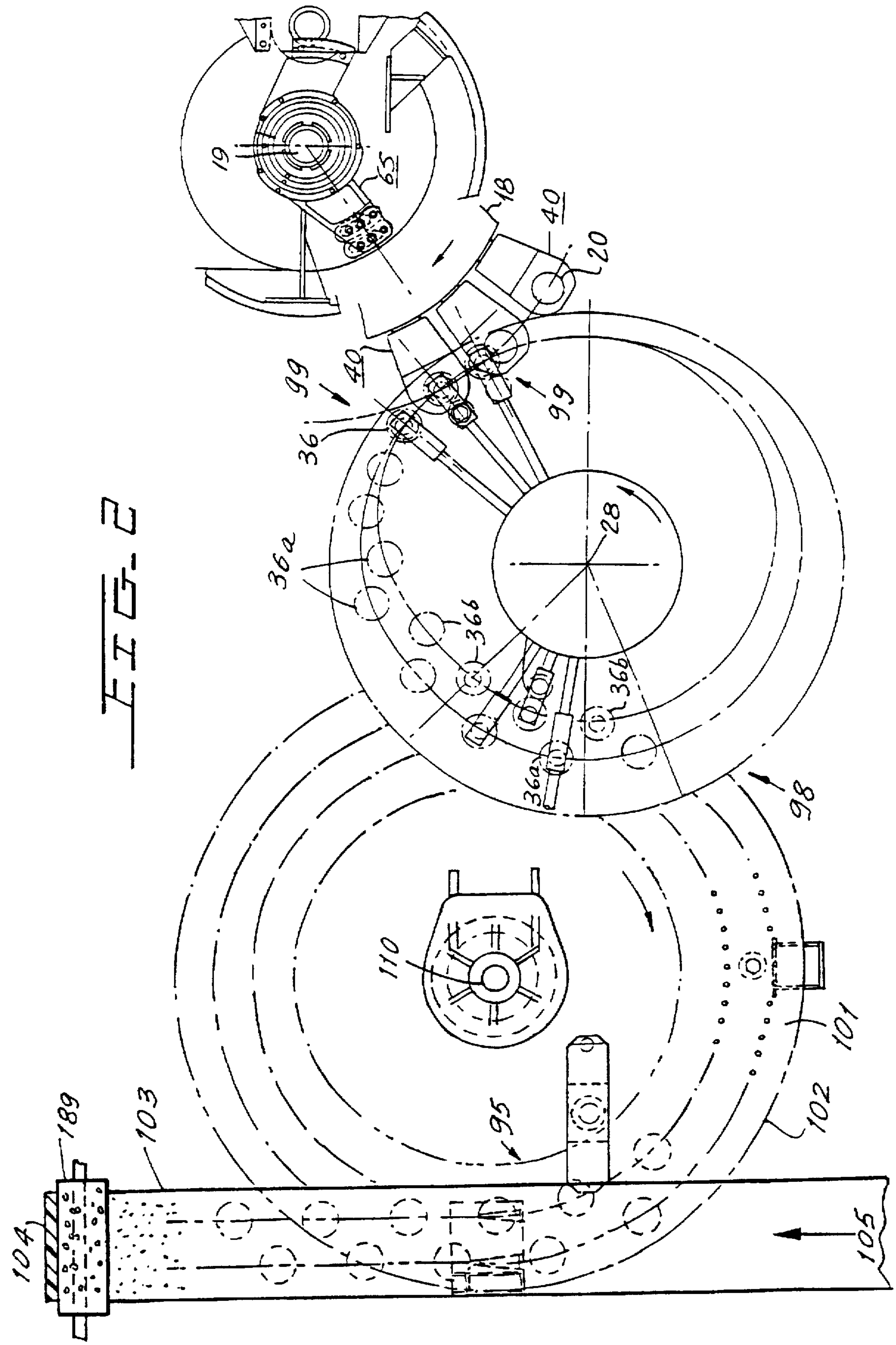
FIG. 2 is a fragmentary side elevation in schematic form of the major can carrying and transfer elements.
Figure 3:
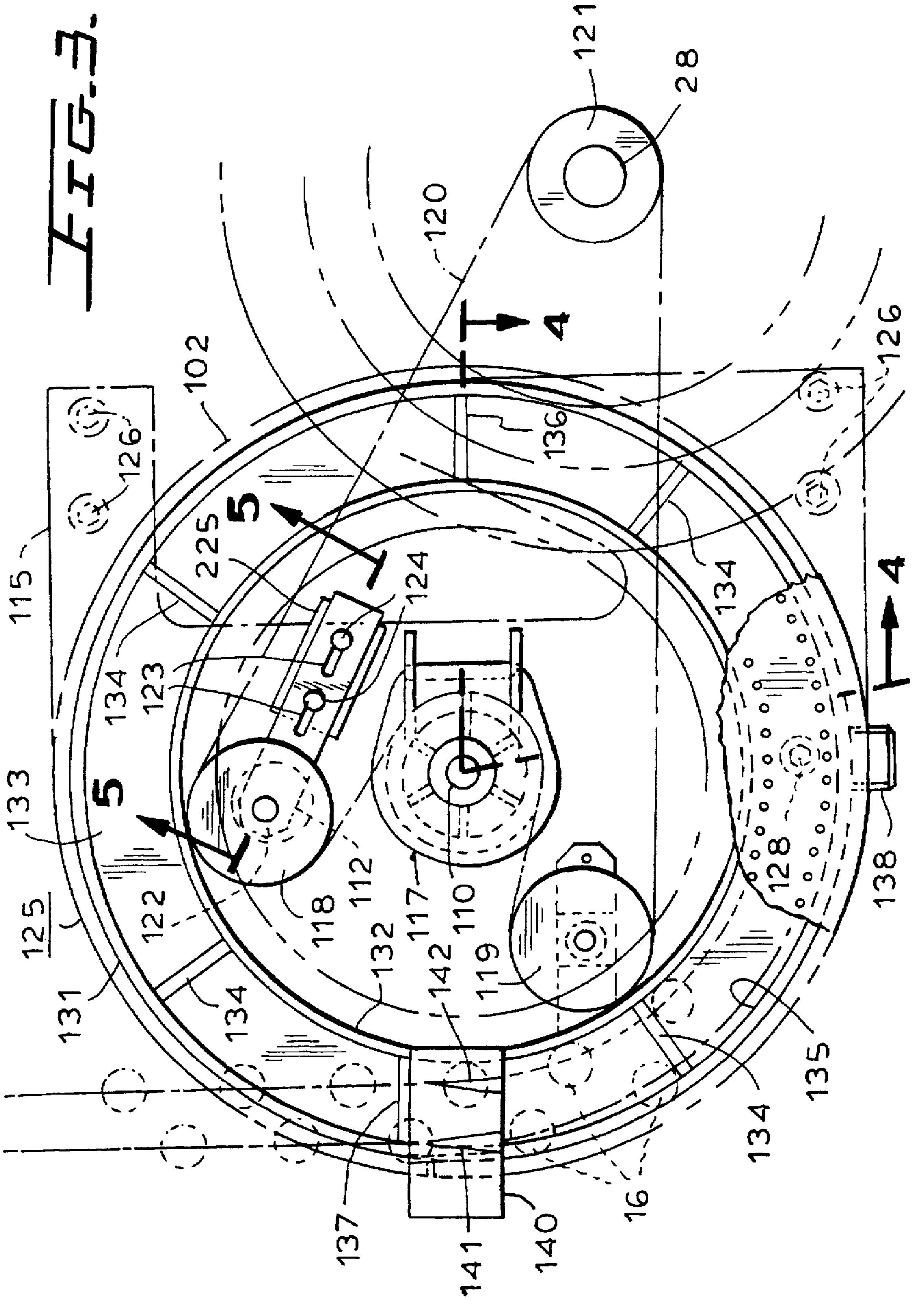
FIG. 3 is a front elevation of the drive mechanism and vacuum plenum for the transfer conveyor plate.
Figure 7:
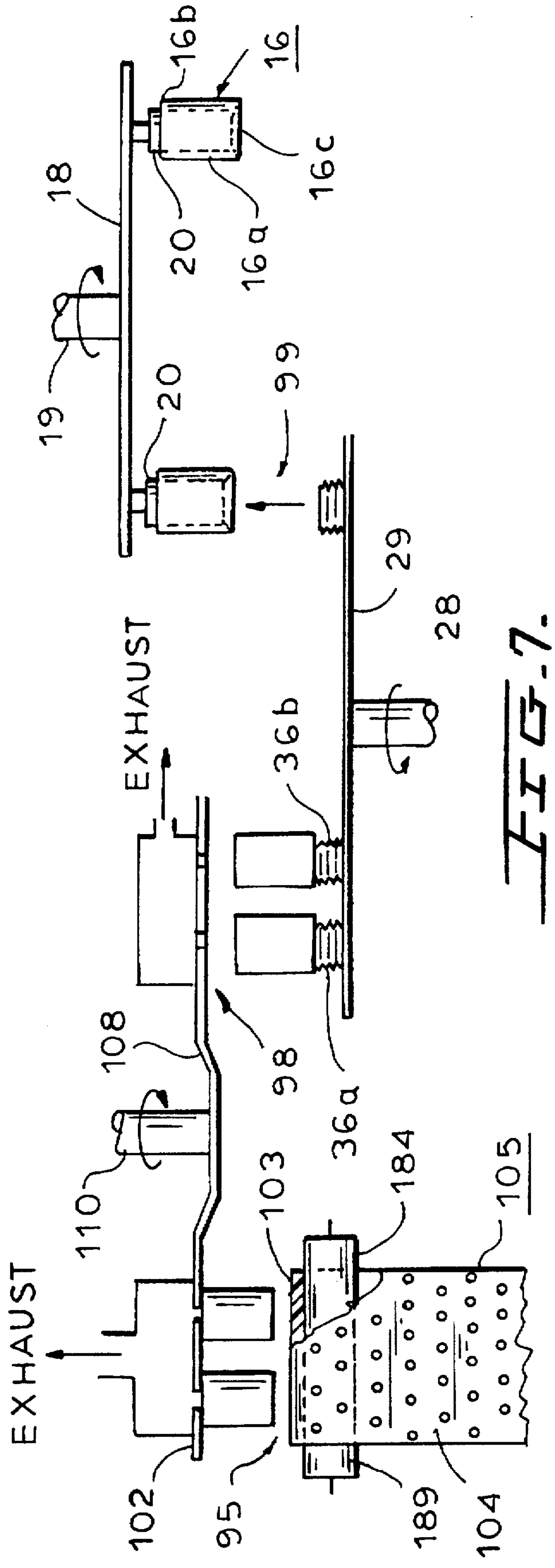
FIG. 7 is a plan view in schematic form presented to simplify understanding of the construction and operation of the apparatus illustrated in the other figures.

Briefly, the apparatus of FIG. 1 herein includes infeed conveyor chute 15 which receives undecorated cans 16 each open at one end **16*b* thereof (FIG. 7), from a can supply (not shown) and places them in arcuate cradles or pockets 17 along the periphery of aligned axially spaced rings 14 that are fixedly secured to wheel-like mandrel carrier 18 keyed to horizontal drive shaft 19. Horizontal spindles or mandrels 20, each part of an individual mandrel/actuator subassembly 40 (FIG. 2), are also mounted to wheel 18 with each mandrel 20 normally being in spaced horizontal alignment with an individual pocket 17 in a short region extending downstream from infeed conveyor 15. In this short region undecorated cans 16 are moved horizontally, being transferred from each cradle 17 to an individual mandrel 20. Suction applied through an axial passage extending to the outboard or front end of mandrel 20 draws container 16 rearward to final seating position on mandrel 20 where the closed end 16*c* of can 16 engages the outboard end of mandrel 20. Each mandrel 20 should be loaded properly with a can 16 by the time mandrel 20 is in the proximity of sensor 33 which detects whether each mandrel 20 contains a properly loaded can 16. In a manner known to the art, if sensor 33 detects that a mandrel 20 is unloaded or is not properly loaded, then as this particular mandrel 20 passes through the decorating zone, wherein printing blanket segments 21 normally engage cans 16 on mandrels 20, this unloaded or misloaded mandrel 20 is moved to a "no-print" position in which it will not be engaged by a blanket segment 21**.

While mounted on mandrels 20, cylindrical sidewall **16*a* of each can 16 is decorated by being brought into engagement with one of the continuously rotating image transfer mats of blanket 21 of the multicolor printing press decorating section indicated generally by reference numeral 22. Thereafter, and while still mounted to a mandrel 20, each decorated can 16 is coated with a protective film, typically varnish, applied thereto by engagement with the periphery of applicator roll 23 in the overvarnish unit indicated generally by reference numeral 24. Cans 16 with decorations and protective coatings thereon are then transferred from mandrels 20 to holding elements or pickup devices, constituted by suction cups 36. During this transfer the pickup devices 36 are traveling in single file along the periphery of transfer wheel 27 in a first transfer zone indicated by reference numeral 99 (FIG. 2) that is located between overvarnish unit 24 and the infeed of cans 16 to pockets 17. Transfer wheel 27 rotates about horizontal shaft 28 as a center and at second transfer zone 98 cans 16 carried by wheel 27 are deposited on the forward planar surface 101 of ring-shaped suction transfer conveyor plate 102. The latter carries cans 16 downstream from transfer zone 98 through a holding zone that extends to loading zone 95 where closed ends 16*c* of cans 16 are in close proximity with the upward moving vertical flight 103 of closed loop perforated belt conveyor 105. Cans 16 on conveyor plate 102 are drawn forward to engage vertical flight 103 by suction forces generated in a well known manner to extend through conveyor belt 105 and rearward of flight 103 at required portions thereof. At its downstream or upper end, flight 103 is guided by suction idler roll 189 and is connected with horizontal flight 104. Belt conveyor 105 may convey cans 16 through a curing oven(not shown) or to one or more additional conveyors (not shown) that will convey cans 16** through the curing oven.

As disclosed in U.S. Pat. No. 5,183,145, in transfer region 99 suction holding devices 36 are in single file and are rearranged on transfer wheel 27 to be in two rows **36*a*, 36*b* while passing through transfer region 98. U.S. Pat. No. 5,183,145 also discloses that in transfer region 99 spacing between adjacent holding devices 36 is substantially less than spacing between adjacent mandrels 20 and the latter are traveling at a linear speed substantially faster than that of holding devices 36. In addition, U.S. Pat. No. 5,183,145 discloses how the position of a relatively stationary valve element on V-shaped casting 65 is adjusted automatically to maintain coordinated operation between mandrel carrier 18 and transfer wheel 27 as linear speed differences between mandrels 20 and holding devices 36** vary.

Figure 4:
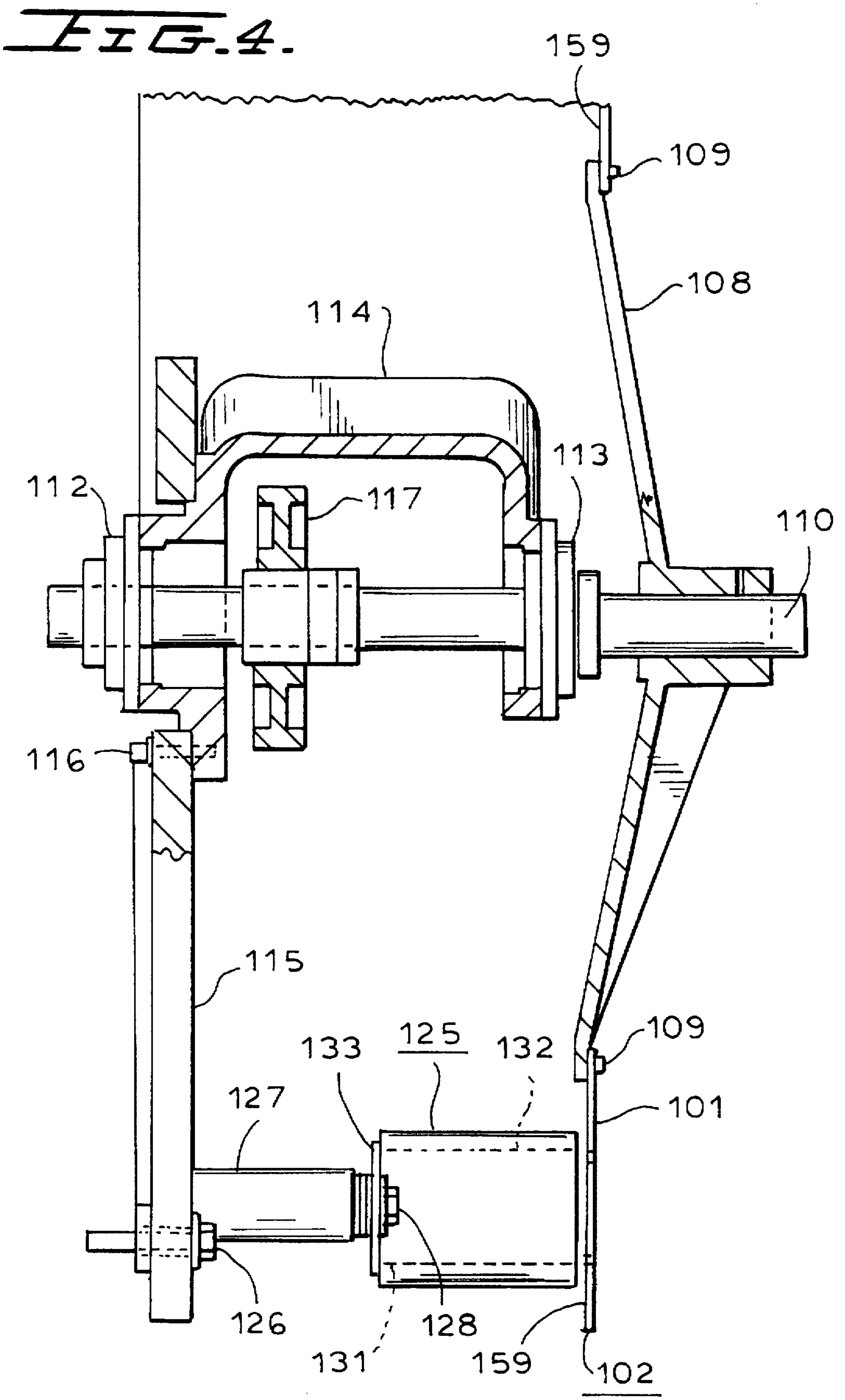
FIG. 4 is a fragmentary developmental view taken along lines 4—4 of FIG. 3 looking in the direction of arrows 4—4.
Figure 5:
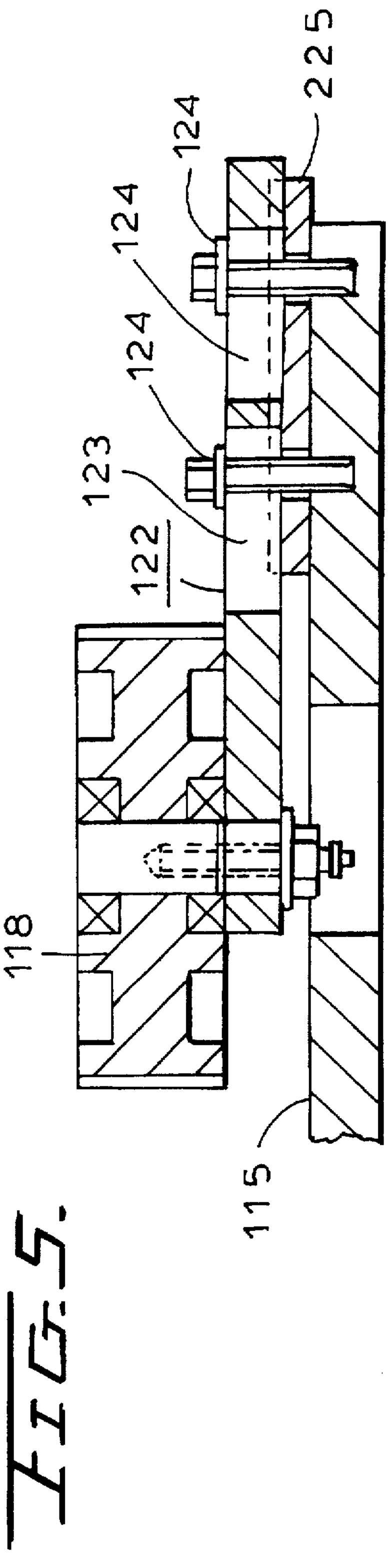
FIG. 5 is a cross-section of the belt tensioner taken through line 5—5 of FIG. 3 looking in the direction of arrows 5—5.

Circular opening 107 at the center of ring-shaped plate 102 is closed by circular cover 108 (FIG. 4), with a plurality of bolts 109 along the periphery of cover 108 extending through clearance apertures 111 (FIG. 6) to fixedly secure ring plate 102 to cover 108. The latter is keyed to stub shaft 110 which is rotatably supported in axially spaced bearings 112, 113 mounted on opposite arms of U-shaped bracket 114 that is secured to mounting plate 115 by a plurality of bolts 116. Driven sprocket 117 disposed between the arms of bracket 114 is mounted on shaft 110 and keyed thereto. Double sided timing belt 120 is engaged with the teeth of driven sprocket 117, idle sprockets 118, 119 and drive sprocket 121. The latter is keyed to transfer carrier drive shaft 28. Idler 118 is rotationally mounted at one end of arm 122, with the other end of arm 122 nesting between the short arms of U-shaped spacer member 225 having a web portion interposed between arm 122 and mounting plate 115. Clamping bolts 124, 124 extend through longitudinal slots 123, 123 in arm 122 and through clearance apertures in the web portion of spacer 225 to engage threaded apertures in mounting plate 115 and thereby maintain arm 122 in its adjusted position.

A plurality of bolts 126 fixedly secured mounting plate 115 to a stationary frame portion of the apparatus, with a plurality of standoffs 127 projecting forward from mounting plate 115. Circular plenum structure 125 is secured to the forward ends of standoffs 127 by a plurality of bolts 128.

Plenum structure 125 includes concentric circular sidewalls 131, 132 connected by rear wall 133 to form a circular trough. The free front edges of sidewalls 131, 132 are held apart by a plurality of rod-like elements 134 as well as by barrier partitions 136 and 137 at the respective upstream and downstream ends of suction plenum 135 that is formed therebetween and extends for the lower half of the trough formed by structure 125. Short sleeve 138 disposed at the six o'clock position is provided for securing a hose (not shown) from a vacuum source (not shown) to plenum 135. Extending across structure 125 at the front thereof and disposed downstream from partition 137 is control number 140 which has a pair of elongated cutouts 141, 142 that taper downward in a downstream direction, for a reason that will become obvious.

Rotating conveyor plate 102 is disposed in front of plenum structure 125, being closely spaced with respect thereto to provide a cover for plenum 135. A suitable spacing between rear surface 159 of plate 102 and the free forward ends of plenum walls 131, 132 is 0.020".

Figure 6:
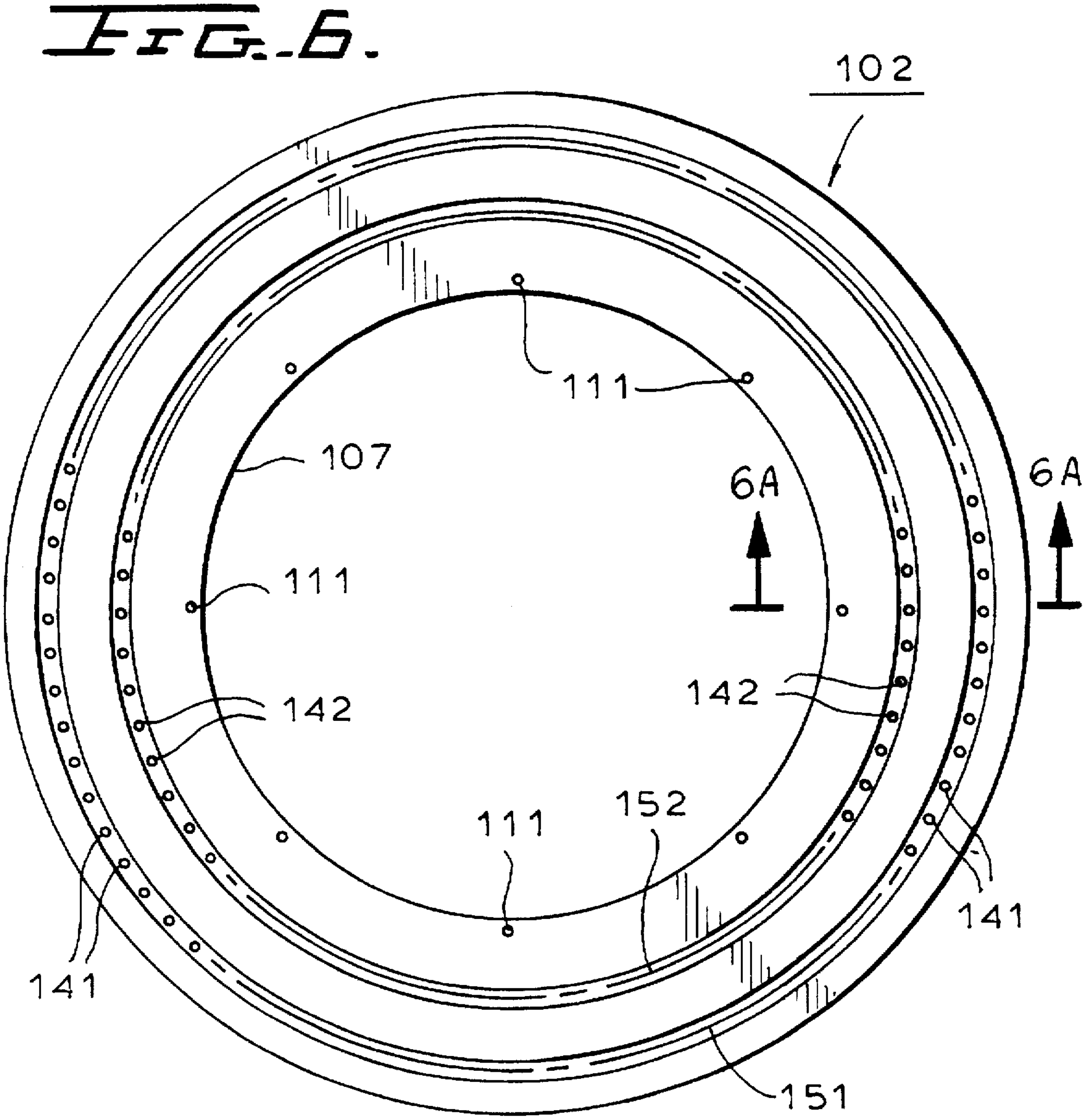
FIG. 6 is a front elevation of the transfer conveyor plate.

As seen best in FIG. 6, transfer conveyor plate 102 is provided with a plurality of apertures 141 that are arranged in a single row to form an outer circular array and another plurality of apertures 142 that are arranged in a row to form an inner circular array. The inner and outer circular arrays of apertures 141 and 142 are concentric about rotational axis 110 for plate 102 as a center. The front facing surface of plate 102 is provided with concentric circular undercuts 151, 152 that are very shallow. Apertures 141 of the outer array extend rearward from floor 161 of outer undercut 151 and apertures 142 of the inner array extend rearward from floor 162 of the inner undercut 152.

In a suitable construction for handling aluminum cans that are 2.6 inches in diameter, each of the floors 161 and 162 is ¾" wide, each of the apertures 141, 142 is 7/32" in diameter and spacings between adjacent apertures in each circular row are approximately 1.3 inches. With this arrangement each of the cans 16 is held on transfer conveyor plate 102 by suction forces which draw air into plenum 135 through essentially two apertures 141 when can 16 is at the outer array and by substantially two apertures 142 when can 16 is at the inner array.

Figure 6A:
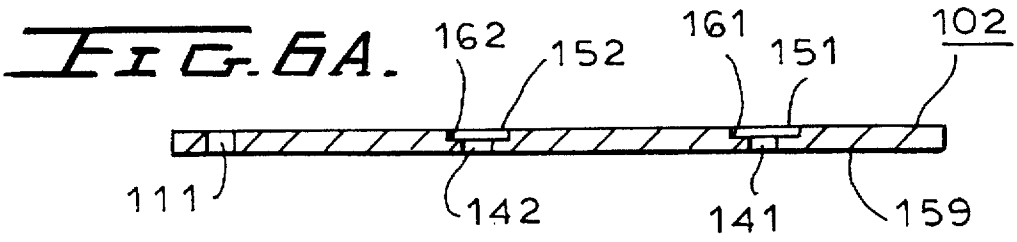
FIG. 6A is a cross-section taken through line 6A—6A of FIG. 6 looking in the direction of arrows 6A—6A.
Figure 6B:
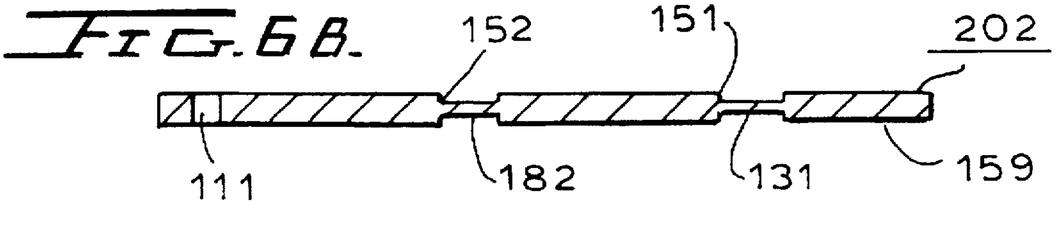
FIG. 6B is another cross-section taken through line 6A—6A of FIG. 6 looking in the direction of arrow 6A—6A and illustrating a modified construction for the transfer conveyor plate.

FIG. 6B illustrates transfer conveyor plate 202 which contains the features of conveyor plate 102 if FIG. 6A, modified by adding rear surface shallow circular undercuts 181, 182 that are aligned with the respective front surface shallow undercuts 151, 152. Although not illustrated, undercuts 181, 182 may not have the same depth and/or width as the respective shallow undercuts 151, 152. If the front facing surface containing undercuts 151, 152 for transfer conveyor plate 202 is damaged, mounting of plate 202 in FIG. 6B to cover 108 may be reversed to present a new and/or undamaged surface which faces forward to be engaged by the open ends **16*o* of cans 16 that are carried by suction holding elements 36*a*, 36*b***.

Undercuts 151, 152 are provided in transfer conveyor plate 102 to prevent buildup of an excess suction force that could cause cans 16 to collapse, as might occur if the entire free end of the can sidewall was to seal against the forward facing surface of transfer conveyor plate 102.

Thus it is seen that the instant invention provides a continuously rotating suction transfer conveyor plate in combination with a suction conveyor belt to replace a conventional pin oven conveyor chain. While the foregoing description describes suction forces as being used to attract and hold cans on the conveyor plate and on the conveyor belt.

When a deco-chain is used, it is necessary for suction holding devices **36*a*, 36*b* to track the pins on the deco-chain in order to affect reliable transfer of cans 16 from holding suction devices 36*a*, 36*b*. The instant construction is more foregoing in the region where cans 16 are removed from devices 36*a*, 36*b* to the point where linear speed of cans 16 on conveyor plate 102 may be slower than linear speed of cans 16 at the point where they are dismounted from devices 36*a*, 36*b***. Suction holding is suitable for handling both ferrous and non-ferrous (i.e. aluminum) cans. However, when ferrous cans are being decorated, magnetic rather than suction forces may be used to attract and hold the ferrous cans on the conveyor plate and/or conveyor belt.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for conveying containers each of which has an open end and a closed end opposite said open end, said apparatus including:

continuous motion first and second transfer conveyors rotatable about laterally spaced respective first and second axes that are generally parallel to each other;

a continuous motion mandrel carrier rotatable about a third axis, and a continuous motion belt conveyor including a first flight section;

said first transfer conveyor being disposed axially forward of both said second transfer conveyor and said carrier, and said first flight section passing in front of said second transfer conveyor;

a plurality of container carrying mandrels on said carrier, extending forward therefrom;

a plurality of container carrying holding units on said first transfer conveyor, projecting rearward therefrom, and being in an array surrounding said first axis;

said second transfer conveyor being provided with a container receiving forward facing generally planar surface that is generally perpendicular to said second axis and from which a first attracting force extends to draw containers rearward from said first transfer conveyor toward said second transfer conveyor to operatively engage and be held at said planar surface while portions of said planar surface travel through a holding zone;

portions of said carrier and said first transfer conveyor being in confronting relationship at a first transfer zone where said holding units receive containers that are being carried by said mandrels;

portions of said first and second transfer conveyors being in confronting relationship at a second transfer zone where said generally planar surface receives containers that project rearward from said holding units;

portions of said first flight section and said second transfer conveyor being in confronting relationship at a loading zone where containers which project forward from said second transfer conveyor are received by said first flight section of said belt conveyor, with containers so received being held on said first flight section by another attracting force;

said loading zone being downstream of said second transfer zone, and said holding zone extending between said second transfer zone and said loading zone;

said closed ends being forward of said open ends while said containers are at said first and second transfer zones and at said loading zone;

at said second transfer zone said open ends being in operative engagement with said generally planar surface, at said first transfer zone said closed ends being in operative engagement with said holding units, and at said loading zone said closed ends being in operative engagement with said first flight section.

2. Apparatus for conveying containers as set forth in claim 1 in which said belt conveyor also includes a second flight section that is downstream of said first flight section and moves forward away from said second transfer conveyor.

3. Apparatus for conveying containers as set forth in claim 2 in which said first flight section moves upward while traveling through said loading zone.

4. Apparatus for conveying containers as set forth in claim 3 in which containers are held on said belt conveyor by said another attracting force as containers are moved thereby from said loading zone to said second flight section; said another attracting force being generated by suction.

5. Apparatus for conveying containers as set forth in claim 4 in which containers are oriented with their respective longitudinal axes generally parallel to said first and second axes while being moved from said loading zone toward said second flight section.

6. Apparatus for conveying containers as set forth in claim 1 in which said attracting force is generated by suction.

7. Apparatus for conveying containers as set forth in claim 1 in which said second transfer conveyor includes a stationary low pressure manifold having an open side facing forward and a plate-like member having a first surface constituting said generally planar surface;

said plate-like member being rotatable continuously about said second axis as a center and being operatively positioned in front of said member to cover said open side;

said plate-like member having a plurality of apertures extending therethrough and positioned to communicate with said manifold as said plate-like member rotates, whereby low pressure within said manifold generates said attracting force.

8. Apparatus for conveying containers as set forth in claim 7 in which at least some of said apertures are arranged in a circular array surrounding said second axis as a center.

9. Apparatus for conveying containers as set forth in claim 7 in which the second transfer conveyor has a shallow groove extending rearward from said planar surface and surrounding said second axis, with said shallow groove being defined by spaced first and second side boundary walls, and at least some of said apertures communicating with said shallow groove;

each of said containers having a transverse cross-sectional dimension that is substantially greater than spacing between said side boundary walls;

said first and second transfer conveyors being operatively positioned so containers that are received by said second transfer conveyor extend across both of said side boundary walls.

10. Apparatus for conveying containers as set forth in claim 9 in which said shallow groove is also defined by a rear boundary wall;

said at least some of said apertures extending rearward from said rear boundary wall.

11. Apparatus for conveying containers as set forth in claim 10 in which said at least some of said apertures are arranged in a circular array surrounding said second axis as a center.

12. Apparatus for conveying containers as set forth in claim 11 in which said transverse cross-sectional dimension is substantially greater than spacing between adjacent apertures in said circular array.

13. Apparatus for conveying containers as set forth in claim 12 in which said transverse cross-sectional dimension is at least equal to generally two times said spacing between adjacent apertures in said circular array.

14. Apparatus for conveying containers as set forth in claim 7 in which said apertures are arranged in concentric first and second circular arrays surrounding said second axis as a center, with said second array being interposed between said second axis and said first array;

at said second transfer zone said holding units being arranged to form first and second rows of holding units, with said second row being interposed between said first axis and said first row;

said first and second transfer conveyors being operatively positioned whereby containers on said holding units in said first row are transferred to said planar surface at said second array, and containers in said holding units in said second row are transferred to said planar surface at said first array.

15. Apparatus for conveying containers as set forth in claim 14 in which the second transfer conveyor has first and second shallow grooves each extending rearward form said planar surface and surrounding said second axis, with each of said shallow grooves being defined by a pair of spaced side boundary walls, said apertures of said first circular array communicating with said first shallow groove and said apertures of said second circular array communicating with said second shallow groove;

each of said containers having a transverse cross-sectional dimension that is substantially greater than spacing between said side boundary walls defining each of said shallow grooves so that containers transferred to said planar surface at said first array extend across both of said side boundary walls defining said first shallow groove and containers transferred to said planar surface at said second array extend across both of said side boundary walls defining said second shallow groove.

16. Apparatus for conveying containers as set forth in claim 15 in which each of said shallow grooves is also defined by an individual rear boundary wall; and said apertures extend rearward from said rear boundary walls.

17. Apparatus for conveying containers as set forth in claim 16 in which said transverse cross-sectional dimension is substantially greater than spacing between adjacent apertures in each of said first and second circular arrays.

18. Apparatus for conveying containers as set forth in claim 17 in which said transverse cross-sectional dimension is at least approximately two times said spacing between adjacent apertures in each of said circular arrays.

19. Apparatus for conveying containers as set forth in claim 18 in which apertures of said first circular array are arranged as a first row of apertures and apertures of said second circular array are arranged as a second row of apertures;

said apertures in said first row of apertures being spaced equally from each other and being disposed midway between said side boundary walls defining said first shallow groove; and said apertures in said second row of apertures being spaced equally from each other and being disposed midway between said side boundary walls defining said second shallow groove.

20. Apparatus for conveying containers as set forth in claim 1 wherein said holding units are arranged in single file as they pass through said first transfer zone and said mandrels are in single file as they pass through said first transfer zone;

in said transfer zone, spacings between adjacent ones of said mandrels being substantially greater than spacings between adjacent ones of said holding units and linear speed of said mandrels being substantially greater than linear speed of said holding units.

* * * * *